United States Patent
Wago et al.

(10) Patent No.: US 7,378,028 B2
(45) Date of Patent: May 27, 2008

(54) METHOD FOR FABRICATING PATTERNED MAGNETIC RECORDING MEDIA

(75) Inventors: Koichi Wago, Sunnyvale, CA (US); HongYing Wang, Fremont, CA (US); Nobuo Kurataka, Campbell, CA (US); Gennady Gauzner, Livermore, CA (US); Neil Deeman, Alamo, CA (US)

(73) Assignee: Seagate Technology LLC, Scotts Valley, CA (US)

( * ) Notice: Subject to any disclaimer, the term of this patent is extended or adjusted under 35 U.S.C. 154(b) by 414 days.

(21) Appl. No.: 10/859,202

(22) Filed: Jun. 3, 2004

(65) Prior Publication Data

US 2005/0271819 A1 Dec. 8, 2005

(51) Int. Cl.
G11B 11/00 (2006.01)

(52) U.S. Cl. ............... 216/22; 216/41; 216/44; 216/49; 216/57; 216/67; 216/83; 216/100

(58) Field of Classification Search ............. None
See application file for complete search history.

(56) References Cited

U.S. PATENT DOCUMENTS

| | | | |
|---|---|---|---|
| 4,912,585 A | 3/1990 | Belser et al. | |
| 5,772,905 A * | 6/1998 | Chou | 216/44 |
| 5,872,061 A * | 2/1999 | Lee et al. | 438/705 |
| 5,990,060 A * | 11/1999 | Ohmi et al. | 510/175 |
| 6,168,845 B1 | 1/2001 | Fontana, Jr. et al. | |
| 6,759,263 B2 * | 7/2004 | Ying et al. | 438/48 |
| 7,043,823 B2 * | 5/2006 | Childress et al. | 29/603.07 |
| 7,141,438 B2 * | 11/2006 | Ha et al. | 438/3 |
| 7,166,261 B2 * | 1/2007 | Kamata et al. | 423/138 |
| 2002/0079057 A1 * | 6/2002 | Yoshioka et al. | 156/345.31 |
| 2004/0219445 A1 * | 11/2004 | Marinero et al. | 430/31 |
| 2004/0229430 A1 * | 11/2004 | Findeis et al. | 438/257 |
| 2004/0248404 A1 * | 12/2004 | Subrahmanyan et al. | 438/637 |
| 2005/0196960 A1 * | 9/2005 | Koo et al. | 438/649 |

FOREIGN PATENT DOCUMENTS

| | | | |
|---|---|---|---|
| EP | 162349 A2 * | 11/1985 | |
| JP | 58039009 A * | 3/1983 | |
| JP | 07254111 A * | 10/1995 | |
| JP | 2004110926 A * | 4/2004 | |

* cited by examiner

Primary Examiner—Anita K Alanko
(74) Attorney, Agent, or Firm—McDermott Will & Emery LLP

(57) ABSTRACT

A method of fabricating a patterned magnetic layer comprises sequential steps of:

(a) providing a workpiece comprising a non-magnetic substrate, a layer of magnetic material overlying a surface of the substrate, and a layer of a non-magnetic material overlying the layer of magnetic material;

(b) forming a layer of a mask material on the layer of non-magnetic material;

(c) forming a topographical pattern comprising a plurality of recesses in the layer of mask material;

(d) selectively removing portions of the layer of non-magnetic material proximate lower portions of the recesses, thereby exposing selected portions of the layer of magnetic material;

(e) treating the exposed portions of the layer of magnetic material with a liquid for reducing the magnetic properties thereof; and (f) removing the topographically patterned layer of mask material.

22 Claims, 1 Drawing Sheet

METHOD FOR FABRICATING PATTERNED MAGNETIC RECORDING MEDIA

FIELD OF THE INVENTION

The present invention relates to a method for fabricating patterned magnetic recording media and to patterned magnetic recording media obtained thereby. The invention has particular utility in the formation of servo patterns in hard disk magnetic data/information storage and retrieval media and in the formation of bit-patterned magnetic recording media comprising a plurality of discrete magnetic bits.

BACKGROUND OF THE INVENTION

Patterned magnetic recording media, such as servo-patterned media, track-patterned (i.e., discrete track) media, and bit-patterned (i.e., discrete bit) media have been fabricated by a variety of processing techniques, including etching processing such as reactive ion etching, sputter etching, ion milling, and ion irradiation to form a pattern comprising magnetic and non-magnetic surface areas in a layer of magnetic material on a media substrate. Several of the these processing techniques relied upon selective removal of portions of the layer of magnetic material to form the pattern of magnetic and non-magnetic surface areas; whereas others of the processing techniques relied upon partial removal of selected areas of the media substrate on which the magnetic layer is formed, thereby resulting in different transducer head/media surface spacings having an effect similar to formation of a pattern of magnetic and non-magnetic surface areas in the layer of magnetic material. However, a drawback associated with each of these techniques is formation of topographical patterns in the surface of the media, engendering media performance concerns such as transducer head flyability and corrosion, e.g., due to uneven lubricant thickness and adhesion.

As for formation of patterned magnetic media via ion irradiation, a drawback associated therewith is the requirement for use of a high dose of ion irradiation for sufficient suppression of the magnetic properties of the magnetic layer at the selectively irradiated surface areas. Such high dose ion irradiation typically requires an extended processing interval and removal of the ion-irradiated resist materials (utilized for defining the pattern of ion-irradiated surface areas) is difficult.

In view of the foregoing, there exists a need for improved processing methodology and techniques which substantially eliminate the above-described disadvantages, drawbacks, and difficulties associated with the above-described methodologies and techniques for fabricating patterned magnetic media. More specifically, there exists a need for improved processing methodology and techniques for cost-effectively fabricating servo-patterned media, track-patterned (i.e., discrete track) media, and bit-patterned (i.e., discrete bit) media, particularly as utilized in hard disk data/information storage and retrieval systems.

The present invention addresses and solves the above-described problems associated with the above-described methodologies and techniques for fabricating patterned magnetic media, while maintaining full compatibility with all aspects of cost-effective, automated manufacturing processing for pattern formation in magnetic media. Further, the methodology afforded by the present invention enjoys diverse utility in the manufacture of all manner of devices and products requiring pattern formation in a layer of magnetic material.

DISCLOSURE OF THE INVENTION

An advantage of the present invention is an improved method of fabricating a patterned magnetic layer.

Another advantage of the present invention is an improved method of fabricating a patterned magnetic recording medium.

Yet another advantage of the present invention is an improved method of fabricating a servo-patterned magnetic recording medium.

Still another advantage of the present invention is an improved method of fabricating a track-patterned (i.e., discrete track) magnetic recording medium.

A further advantage of the present invention is an improved method of fabricating a bit-patterned (i.e., discrete bit) magnetic recording medium.

Other advantages of the present invention include improved servo-patterned, track-patterned, and bit-patterned magnetic recording media fabricated according to the inventive methodology.

Additional advantages and other aspects and features of the present invention will be set forth in the description which follows and in part will become apparent to those having ordinary skill in the art upon examination of the following or may be learned from the practice of the present invention. The advantages of the present invention may be realized and obtained as particularly pointed out in the appended claims.

According to an aspect of the present invention, the foregoing and other advantages are obtained in part by a method of fabricating a patterned magnetic layer, comprising sequential steps of:

(a) providing a workpiece comprising a non-magnetic substrate, at least one layer of magnetic material overlying a surface of the substrate, and a layer of a non-magnetic material overlying the at least one layer of magnetic material;

(b) forming a layer of a mask material on the layer of non-magnetic material;

(c) forming a topographical pattern comprising a plurality of recesses in the layer of mask material;

(d) selectively removing portions of the layer of non-magnetic material proximate lower portions of the recesses in the layer of mask material, thereby exposing selected portions of the at least one layer of magnetic material;

(e) treating the exposed portions of the at least one layer of magnetic material with a liquid for suppressing the magnetic properties thereof; and (f) removing the topographically patterned layer of mask material.

According to preferred embodiments of the present invention, the method further comprises a step of:

(g) re-forming a layer of the non-magnetic material overlying the at least one layer of magnetic material.

Other preferred embodiments of the present invention include those wherein: step (a) comprises providing a workpiece for a magnetic recording medium, e.g., an annular disk-shaped workpiece for a granular perpendicular magnetic recording medium) and the layer of non-magnetic material comprises a protective overcoat material, e.g., a carbon (C)-based protective overcoat material; step (b) comprises forming a layer of a resist material, e.g., a layer of a thermoplastic resist material selected from the group consisting of polymethylmethacrylate (PMMA), styrene-acrylonitrile (SAN), and polystyrene; step (c) comprises forming a topographical pattern corresponding to a pattern for a servo-patterned medium, a track-patterned medium with discrete tracks, or a bit-patterned medium with discrete magnetic bits, preferably by means of a heat-transfer-stamp (HTS) process; step (d) further comprises removing residual mask material at the lower portions of the recesses, e.g., by treating said portions of said layer of non-magnetic material proximate said lower portions of said recesses in said layer of mask material with a plasma, preferably an oxygen ($O_2$) plasma, the plasma treatment, if necessary, further comprising removing residual mask material at the lower portions of the recesses; step (e) comprises treating the exposed portions of the at least one layer of magnetic material with a liquid comprising at least one cleaning agent for suppressing the magnetic properties thereof either by oxidation or by dissolution, and further comprises ultrasonically agitating the liquid during the treating; step (f) comprises removing the topographically patterned layer of mask material by means of a solvent; and step (g) comprises re-forming the layer of protective overcoat material, e.g., re-forming a layer of a carbon (C)-based protective overcoat material.

Another aspect of the present invention is a servo-patterned magnetic recording medium made by the above process.

Yet another aspect of the present invention is a track-patterned magnetic recording medium made by the above process.

A still further aspect of the present invention is a bit-patterned magnetic recording medium made by the above process. Additional advantages and aspects of the present invention will become readily apparent to those skilled in the art from the following detailed description, wherein embodiments of the present invention are shown and described, simply by way of illustration of the best mode contemplated for practicing the present invention. As will be described, the present invention is capable of other and different embodiments, and its several details are susceptible of modification in various obvious respects. Accordingly, the drawings and description are to be regarded as illustrative in nature, and not as limitative.

BRIEF DESCRIPTION OF THE DRAWING

The following detailed description of the embodiments of the present invention can best be understood when read in conjunction with the following drawings, in which the features are not necessarily drawn to scale but rather are drawn as to best illustrate the pertinent features, wherein.

DESCRIPTION OF THE INVENTION

Figure 1:
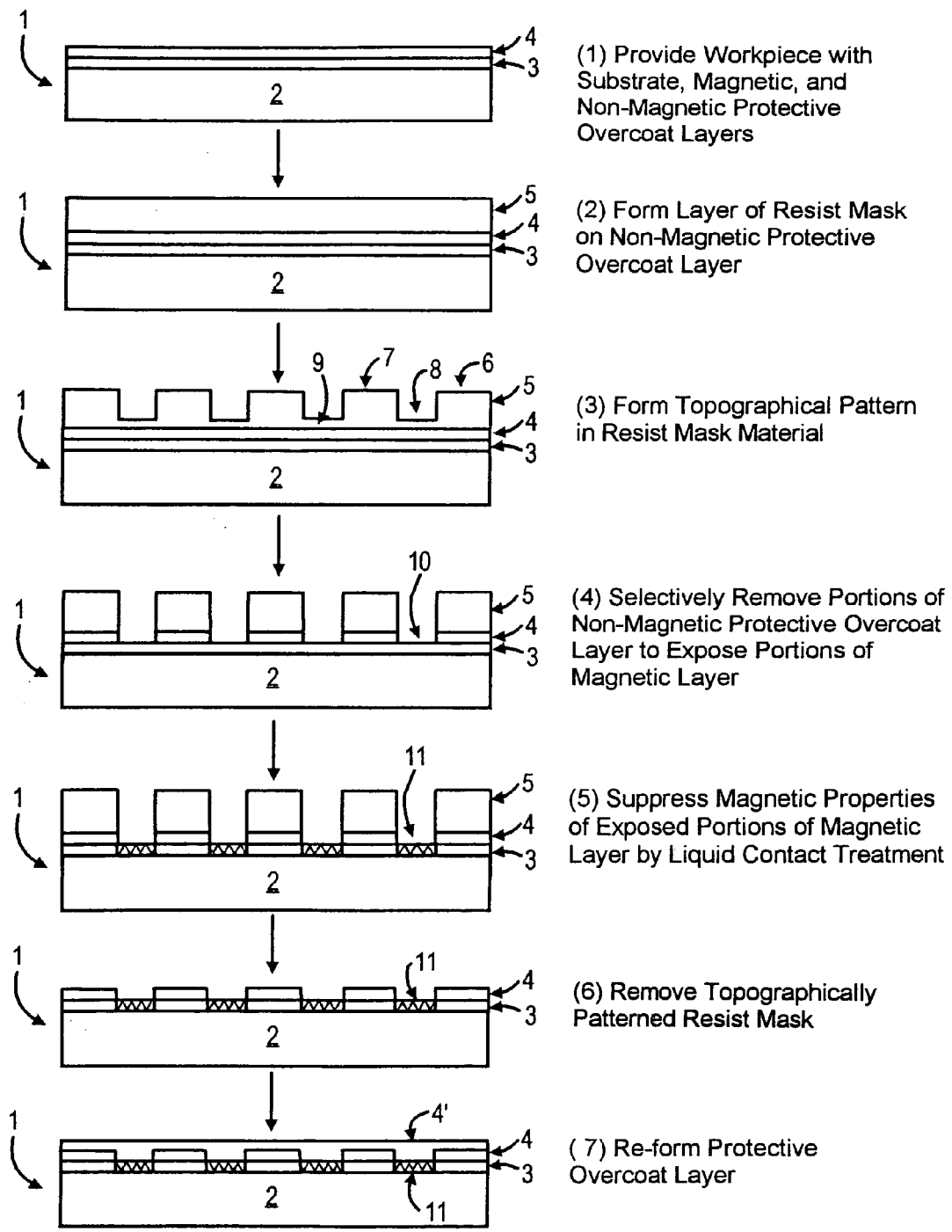
FIG. 1 schematically illustrates, in simplified cross-sectional view, a sequence of steps for fabricating a patterned magnetic layer according to an embodiment of the present invention.

The present invention addresses and solves the above-described problems attendant upon forming patterned magnetic layers and devices comprising same (e.g., hard disk magnetic recording media), utilizing the above-described methodologies and techniques involving various etching and ion irradiation techniques, while maintaining full compatibility with all aspects of automated manufacturing processing for pattern formation in magnetic media. Advantageously, the inventive methodology can be practiced in a cost-effective manner without requiring capital-intensive processing techniques while minimizing the number of required topographical patterning steps. Further, the methodology afforded by the present invention enjoys diverse utility in the manufacture of all manner of devices and products requiring pattern formation in a layer of magnetic material.

Key features of the inventive methodology for forming patterned magnetic recording media include steps of forming a layer of a resist material on a surface of a workpiece in the form of magnetic recording medium including a protective overcoat layer overlying at least one magnetic recording layer, forming a topographical pattern in the surface of the resist layer which corresponds to a desired magnetic pattern to be formed in the at least one magnetic layer, selectively removing the thus-exposed portions of the protective overcoat layer by means of a plasma treatment, treating the thus-exposed portions of the at least one magnetic layer with a liquid for suppressing the magnetic properties thereof, removing the topographically patterned resist layer, and re-forming the protective overcoat layer. Subsequent processing of the thus-patterned media, e.g., lubricant application, buffing, and wiping, may then be performed in conventional manner.

Referring to FIG. 1, schematically illustrated therein, in simplified cross-sectional view, is a sequence of steps for fabricating a patterned magnetic recording medium according to a preferred embodiment of the present invention.

In a first step according to the invention, a workpiece is provided in the form of a thin-film magnetic recording medium 1 comprised of a non-magnetic substrate 2 with at least one overlying magnetic layer 3 and an overlying protective overcoat layer 4. Additional layers intermediate the magnetic layer 3 and substrate 2, e.g., seed layers, underlayers, intermediate layers, etc., are not shown in the drawing for illustrative simplicity. Further, according to the invention, the nature (i.e., type) of magnetic medium 1 is not critical for practice of the invention, and therefore the at least one magnetic layer 3 may be appropriately structured, for example, for longitudinal, perpendicular, laminated, anti-ferromagnetically coupled (AFC), and granular media. Protective overcoat layer 4 may be formed of any hard, abrasion resistant material suitable for use in hard disk applications, e.g., a diamond-like carbon (DLC) material.

In a second step according to the invention, a resist layer 5 of suitable thickness is formed over the protective overcoat layer 4, as by spin coating. According to a preferred embodiment, resist layer 5 is from about 50 to about 150 nm thick, preferably about 100 nm thick, and comprised of a thermoplastic polymer material, e.g., selected from the group consisting of polymethylmethacrylate (PMMA), styrene-acrylonitrile (SAN), and polystyrene.

According to the next (third) step of the inventive methodology, resist layer 5 is subjected to patterning for forming a topographical pattern 6 therein, corresponding to the type of patterned media desired to be formed. As illustrated, topographical pattern 6 comprises a plurality of elevated areas 7 and recessed areas 8 of appropriate dimensions and spacings for defining the desired pattern in magnetic layer 3. While resist layer 5 may be topographically patterned via conventional photolithographic techniques, a preferred technique according to the invention is a Heat-Transfer-Stamp (HTS) process, as disclosed in co-pending, commonly assigned U.S. patent application Ser. No. 10/087,846, filed Mar. 5, 2002, the entire disclosure of which is incorporated herein by reference.

According to the HTS process, a workpiece, i.e., in this instance a non-magnetic substrate with at least one magnetic layer and a protective overcoat layer formed thereon, and including a layer of an imprintable thermoplastic material formed on the surface of the protective overcoat layer, is pre-heated to a pre-selected high temperature prior to insertion of the heated workpiece in a stamping/imprinting tool employed for performing thermal imprint lithography, whereby the interval for thermal cycling of the stamping/imprinting tool between higher and lower temperatures is eliminated or at least reduced. According to another key feature of the HTS methodology, the "process window", i.e., the maximum allowable interval between removal of the pre-heated workpiece from the separate heating means and its insertion in the stamping/imprinting tool, is increased by placement of a thermally insulating spacer layer beneath the lower surface of the workpiece, whereby the rate of heat loss therefrom, hence rate of temperature reduction, is reduced A sequence of steps for performing an illustrative, but not limitative, embodiment of a high quality, high reproduction fidelity HTS process for nano-imprint lithography utilizing a Ni-surfaced "master" or stamper/imprinter will now be illustrated. In a preliminary step, a thin film or layer of a thermoplastic polymer, e.g., polymethylmethacrylate (PMMA), is spin-coated on an annular disk-shaped magnetic recording medium (as described supra). In another preliminary step, a stamper/imprinter having a Ni or Ni alloy imprinting surface formed with a negative image pattern of features, e.g., a servo pattern with lateral dimensions of about 600 nm and heights of about 170 nm, is fabricated by conventional optical lithographic patterning/etching techniques, provided with a thin layer of an anti-sticking or release agent (typically a fluorinated polyether compound such as Zdol™, available from Ausimont, Thorofare, N.J.), and installed in a stamping/imprinting tool, by means of an upper mounting block in contact with the flat upper surface of the stamper/imprinter. The upper mounting block, termed a "top mold", includes a heating means for maintaining the stamper/imprinter at an elevated temperature close to the glass transition temperature $T_g$ of the thermoplastic polymer layer, e.g., ~105° C. for PMMA. In the next step according to the HTS methodology, the workpiece is heated, as by placing the lower surface thereof in contact with a heater block separate from the stamping/imprinting tool, to an elevated temperature substantially greater than the glass transition temperature ($T_g$) of the PMMA thermoplastic layer, e.g., above about 105° C., typically about 200° C., after which the heated workpiece is rapidly transferred to the stamping/imprinting tool such that its lower surface is supported by a heated bottom mold (maintained at the same temperature <$T_g$ as the heated top mold) and the patterned imprinting surface of the Ni-based stamper/imprinter pressed into contact with the surface of the heated thermoplastic PMMA layer of the substrate/workpiece at a suitable pressure, e.g., about 10 MPa. The short interval required for transfer of the heated substrate/workpiece to the stamping/imprinting tool for imprinting of the PMMA layer prior to lowering of the temperature of the PMMA layer below a minimum temperature required for imprinting, is termed the "process window". The transfer step is performed consistent with the short interval requirement of the process window, i.e., workpiece transfer is performed as rapidly as is practicable. Typically, transfer of the heated workpiece to the stamping/imprinting tool is accomplished within several seconds in order to prevent cooling of the heated PMMA thermoplastic layer to a temperature below that which provides optimal, high quality, faithful replication of the surface features of the imprinting surface of the stamper/imprinter. As a consequence of the high pressure urging of the patterned imprinting surface of the stamper/imprinter against the heated PMMA thermoplastic layer, the surface of the heated thermoplastic PMMA layer is imprinted (i.e., embossed) with the negative image of the desired pattern on the imprinting surface of the Ni-based stamper/imprinter. The stamper/imprinter is then maintained within the stamping/imprinting tool in contact with the PMMA layer and under pressure for an interval until the temperature of the workpiece with the imprinted PMMA layer thereon is lowered to the fixed temperature of the top and bottom molds, e.g., about 120° C., after which interval the workpiece is separated from the stamper/imprinter to leave replicated features of the imprinting surface in the surface of the PMMA layer and removed from the stamping/imprinting tool.

Thus, by performing the thermal imprinting process according to a sequence of steps wherein the temperature within the stamping/imprinting tool is maintained substantially constant via external pre-heating of the workpiece to a high temperature above the glass transition temperature of the thermoplastic layer, the HTS methodology eliminates, or at least very substantially and significantly reduces the lengthy thermal cycling interval for heating and cooling of the stamping imprinting tool. The inventive methodology therefore affords several advantages, including, inter alia, reduced thermal cycling intervals; reduced imprint cycle times, e.g., on the order of from about 5 to about 100 sec., leading to greater product throughput rates; and reduced energy consumption resulting from the elimination or minimization of thermal cycling of the relatively massive stamping/imprinting tool.

As indicated in the third view of FIG. 1, a residue of resist material, denoted by reference numeral 9, may remain at the bottom of recesses 8 formed by HTS methodology, which residue is removed in the next (fourth) step according to the inventive methodology, by means of a selective etching process which also removes exposed portions of the protective overcoat layer 4 at the bottom of recesses 8 to expose portions 10 of the at least one magnetic layer 3. A preferred selective etching process for removing residue 9 as well as the exposed portions of the protective overcoat layer 4 comprises plasma etching or ashing, as by means of a reactive plasma, preferably an oxygen ($O_2$) plasma.

In the next (fifth) step according to the invention, the exposed portions 10 of the at least one magnetic layer are treated with a liquid in order to effect selective removal thereof or suppression of the magnetic properties thereof to form substantially non-magnetic areas 11. Preferably, magnetic suppression treatment is performed utilizing an ultrasonically agitated liquid comprising at least one cleaning agent.

According to the sixth and seventh steps of the inventive methodology, the remaining portions of the topographically patterned resist layer 5 are removed, as by dissolution treatment utilizing a suitable solvent, e.g., anisole, and the protective overcoat layer is re-formed over the upper surface of workpiece 1, e.g., by sputtering of a DLC layer 4'.

The thus-processed workpiece may now be subjected to conventional post-processing, e.g., lubrication, buffing, and wiping to form a patterned magnetic medium.

While the above process specifically describes formation of a servo-patterned magnetic recording medium utilizing a stamper/imprinter with a topographically patterned imprinting surface having features in the form of a negative image of the desired servo pattern, the inventive methodology is not limited to the formation of servo-patterned media. Rather, as indicated above, the stamper/imprinter may comprise a topographically patterned imprinting surface which comprising features in the form of a negative image of a track-patterned (i.e., discrete track) or bit-patterned (i.e., discrete bit) medium.

As should be apparent from the above, the inventive methodology advantageously can be practiced in a cost-effective manner without requiring capital-intensive processing techniques, while minimizing the number of required topographical patterning steps. The utility and versatility of the inventive methodology will now be illustrated by reference to the following example.

EXAMPLE

Granular-type perpendicular magnetic recording media comprised, in order, of a non-magnetic substrate, a series of seed, underlayers, and intermediate layers (Ti/FeCoB/Ta/FeCoB/Cu/RuCr10), an in situ-oxidized granular magnetic recording layer (CoCrPt—$SiO_2$ 6-18-4), and a 3.5 nm thick ion beam deposited (IBD) carbon protective overcoat layer were spin-coated with a styrene-acrylonitrile (SAN) resist. A stamper/imprinter having spiral track patterns with a track pitch of ~400 nm and a feature height of ~145 nm was utilized for thermal imprinting of the SAN resist, utilizing the above-described HTS process.

The residual SAN resist at the bottom of the recess features arising from the HTS stamping/imprinting process was then removed by treatment with an oxygen ($O_2$) RF plasma at 100 W power and 200 mTorr pressure for about 3 min., which plasma treatment also removed the underlying portions of the carbon protective overcoat layer at the bottom of the recesses, thereby exposing the underlying granular magnetic layer at the bottom of the recesses.

The thus-patterned media were then subjected to treatment for 20 min. with a liquid comprising at least one cleaning agent, e.g., 2% Oakite TCL 300, an alkaline cleaning solution supplied by Oakite Products, Berkeley Heights, N.J., with ultrasonic agitation at 104 kHZ, 2 quick dump release ("QDR") cycles, followed by spin rinse drying. The remaining SAN resist was removed by dissolution in anisole, and the carbon protective overcoat layer was re-formed by sputtering.

Meanwhile, M-H hysteresis loops of unpatterned (i.e., control) granular perpendicular media, as measured by a Kerr magnetometer before and after the plasma and liquid treatments, indicated that the magnetic properties of the granular magnetic recording layer were effectively destroyed by the plasma and liquid treatments.

A tone signal was recorded on the patterned media utilizing a wide head (i.e., of the type used for media certification) in order to demonstrate the effect of track patterning. Atomic Force Microscopy (AFM) and Magnetic Force Microscopy (MFM) images were obtained of the track-patterned media recorded with the wide tone signal. The MFM image indicated that the magnetic signals were recorded only on discrete tracks and no signals were observed between adjacent tracks where the magnetic properties were suppressed or destroyed by the liquid treatment process.

According to the inventive methodology, the track positions and widths can be precisely defined by the patterning process, which has an advantage over conventional media, where the track positions and widths are adversely affected by track misregistration of the write head and fluctuation (i.e., variation) of the track width. In addition, so-called "track edge noise", where the signal is distorted by the side-fringe field of the write head, can be eliminated or reduced by use of the inventive methodology. The inventive methodology also improves the off-track capability and relaxes the tolerances of narrow read/write transducer heads, allowing higher track density recording.

As has been indicated above, the inventive methodology can be utilized for fabricating bit-patterned media, where each bit consists of a patterned magnetic area which forms a single magnetic domain. Such type media mitigate the superparamagnetic effect by allowing for larger volumes per magnetic domain than is possible with conventional media, where each bit consists of thousands of magnetic grains.

While the invention may be practiced where the exposed portions of the magnetic layer at the bottom of the recessed features are removed during the liquid treatment process or rendered non-magnetic, the latter variant is preferable in minimizing topographical effects of the finished media.

The inventive methodology is not limited to use as described above in the illustrative example; rather, the invention can be practiced with a wide variety of workpieces and devices comprising magnetic layers requiring patterning. Moreover, the imprinted patterns capable of being formed by the invention are not limited to servo patterns for magnetic recording media.

In the previous description, numerous specific details are set forth, such as specific materials, structures, reactants, processes, etc., in order to provide a better understanding of the present invention. However, the present invention can be practiced without resorting to the details specifically set forth. In other instances, well-known processing materials and techniques have not been described in detail in order not to unnecessarily obscure the present invention.

Only the preferred embodiments of the present invention and but a few examples of its versatility are shown and described in the present disclosure. It is to be understood that the present invention is capable of use in other combinations and environments and is susceptible of changes and/or modifications within the scope of the inventive concept as expressed herein.

What is claimed is:

1. A method of fabricating a patterned magnetic layer, comprising sequential steps of:
   (a) providing a workpiece comprising a non-magnetic substrate, at least one layer of magnetic material overlying a surface of said substrate, and a layer of a non-magnetic material overlying said at least one layer of magnetic material;
   (b) forming a layer of a mask material on said layer of non-magnetic material;
   (c) forming a topographical pattern comprising a plurality of recesses in said layer of mask material;
   (d) selectively removing portions of said layer of non-magnetic material proximate lower portions of said recesses in said layer of mask material, thereby exposing selected portions of said at least one layer of magnetic material;
   (e) treating said exposed portions of said at least one layer of magnetic material with a liquid to oxidize the exposed portions and to form substantially non-magnetic material in the exposed portions; and
   (f) removing said topographically patterned layer of mask material.

2. The method according to claim 1, further comprising a step of: (g) reforming a layer of said non-magnetic material overlying said at least one layer of magnetic material.

3. The method according to claim 2, wherein: step (a) comprises providing a workpiece for a magnetic recording medium and said layer of non-magnetic material comprises a protective overcoat material.

4. The method according to claim 3, wherein: step (a) comprises providing an annular disk-shaped workpiece.

5. The method according to claim 3, wherein: step (a) comprises providing a workpiece for a granular perpendicular magnetic recording medium.

6. The method according to claim 3, wherein: step (a) comprises providing a workpiece wherein said non-magnetic layer comprises a carbon (C)-based protective overcoat material.

7. The method according to claim 3, wherein: step (b) comprises forming a layer of a resist material.

8. The method according to claim 7, wherein: step (b) comprises forming a layer of a thermoplastic resist material.

9. The method according to claim 8, wherein: step (b) comprises forming a layer of a thermoplastic material selected from the group consisting of polymethylmethacrylate (PMMA), styrene-acrylonitrile (SAN), and polystyrene.

10. The method according to claim 3, wherein: step (c) comprises forming a topographical pattern corresponding to a pattern for a servo-patterned medium, a track-patterned medium with discrete tracks, or a bit-patterned medium with discrete magnetic bits.

11. The method according to claim 10, wherein: step (c) comprises forming said topographical pattern by a heat-transfer-stamp (HTS) process.

12. The method according to claim 11, wherein: step (d) further comprises removing residual mask material at said lower portions of said recesses.

13. The method according to claim 3, wherein: step (d) comprises treating said portions of said layer of non-magnetic material proximate said lower portions of said recesses in said layer of mask material with a plasma.

14. The method according to claim 13, wherein: step (d) comprises treating said portions of said layer of non-magnetic material proximate said lower portions of said recesses in said layer of mask material with an oxygen ($O_2$) plasma.

15. The method according to claim 13, wherein: step (d) further comprises removing residual mask material at said lower portions of said recesses by said plasma treatment.

16. The method according to claim 3, wherein: step (e) comprises treating said exposed portions of said at least one layer of magnetic material with a liquid comprising at least one cleaning agent.

17. The method according to claim 16, wherein: step (e) further comprises ultrasonically agitating said liquid during said treating.

18. The method according to claim 3, wherein: step (f) comprises removing said topographically patterned layer of mask material by means of a solvent.

19. The method according to claim 3, wherein: step (g) comprises re-forming said layer of protective overcoat material.

20. The method according to claim 19, wherein: step (g) comprises re-forming a layer of a carbon (C)-based protective overcoat material.

21. A method of fabricating a patterned magnetic layer, comprising sequential steps of:
(a) providing a workpiece comprising a non-magnetic substrate, at least one layer of magnetic material overlying a surface of said substrate, and a layer of a non-magnetic material overlying said at least one layer of magnetic material;
(b) forming a layer of a mask material on said layer of non-magnetic material;
(c) forming a topographical pattern comprising a plurality of recesses in said layer of mask material;
(d) selectively removing portions of said layer of non-magnetic material proximate lower portions of said recesses in said layer of mask material, thereby exposing selected portions of said at least one layer of magnetic material;
(e) treating said exposed portions of said at least one layer of magnetic material with an alkaline liquid to oxidize the exposed portions and to form substantially non-magnetic material in the exposed portions; and
(f) removing said topographically patterned layer of mask material.

22. The method according to claim 21, wherein: step (e) further comprises ultrasonically agitating said alkaline liquid during said treating.

* * * * *